Fig. 2B

Nov. 26, 1963  D. D. PIDHAYNY ETAL  3,112,479
COLLISION DIRECTION INDICATION SYSTEM
Filed Feb. 26, 1959  3 Sheets-Sheet 3

DENNY D. PIDHAYNY
EMORY LAKATOS
INVENTORS

BY George C. Thompson, agent
Morris Spector,
ATTORNEY

United States Patent Office 3,112,479
Patented Nov. 26, 1963

3,112,479
COLLISION DIRECTION INDICATION SYSTEM
Denny D. Pidhayny, Los Angeles, and Emory Lakatos, Santa Monica, Calif., assignors to Thompson Ramo Wooldridge Inc., Los Angeles, Calif., a corporation of Ohio
Filed Feb. 26, 1959, Ser. No. 795,729
11 Claims. (Cl. 343—7)

This invention relates to a collision direction indication system, and more particularly to such a system utilizing a plurality of controllable directional antennas.

The present system is a continuation-in-part upon the system disclosed in the co-pending U.S. patent aplication, Serial No. 587,768, filed May 28, 1956, now Patent No. 2,991,463, issued July 4, 1961, entitled, "Collision Indication System," by Emory Lakatos et al., and assigned to the common assignee.

As air traffic continues to increase, the problem of collision avoidance becomes ever more acute. Daily, there are reports of collisions and near misses between aircraft as landing fields and air lanes become more and more congested. With the advent of jet airliners, the already dangerous situation has become worse, since the speeds of these aircraft are such that a pilot must detect a collision course of a more distant object requiring evasive action.

Despite the increase in air traffic hazards and the concern that has been expressed about the collision avoidance problem, up to this time few practical systems have been devised which are capable of even approximating the requirements of an ideal collision indication system. Such an ideal system would provide complete world-wide protection against all terrain and aircraft obstacles and would possess the ability to distinguish between collision and non-collision courses in sufficient time to enable the aircraft bearing the equipment to avoid oncoming obstacles. Also, the system would be able to process information relating to more than one relatively moving object, two or more of which may constitute contemporaneous collision threats, would provide an automatic indication of the proper evasive action, and would be reliable in operation, simple in design, easy to maintain, and completely independent of equipment, other than that borne by the aircraft to be protected. In addition to determining a collision threat, it is desired to detect the direction of approach and thus select the best evasive action. For the great majority of cases encountered by aircraft, the system disclosed herein will meet, or can be adapted to meet, all of the foregoing requirements.

One object of the present invention is to provide an automatic information display depicting the direction of a proper evasive maneuver to avoid a collision and to maintain the display until the danger is removed by the maneuver.

Another object is to provide a display control in an automatic collision warning system capable of allowing a display only after a firm directional decision is reached.

Another object of this invention is to provide a display system capable of holding its display condition regardless of the possible loss of signal due to the evasive maneuver.

Other objects, purposes and characteristic features will become apparent as the description of the invention progresses.

Briefly stated, one embodiment of the present invention is adapted to cooperate with a collision indication system which sorts signals having characteristics proportional to or which are a function of the distances and the closing velocities between the system and objects moving relative thereto, closing velocity being defined as the relative velocity measured along a straight line between the system and an object. The sorting is governed by the principles that warning indications are necessary only in cases of imminent collision or dangerously close passage and that when there is substantially no change in closing velocity between an object and the collision warning system, it means that a collosion or a near collision course exists.

In the direction indicating process, the present invention provides a plurality of signal sensing devices each receptive of signals from distinctly different directions. When an incoming signal is sensed by one of these devices and processed to a level just prior to providing an indication of a collision threat, the sensing devices are selectively desensitized. In response to the desensitization, a determination is made as to the direction of the proper evasive maneuver to avoid a collision. This is accomplished through the interruption of the signal when received from one area and the continuation of the signal when received from another area. The electrical circuit components for controlling the desensitizing of the devices and the presentation of a warning are selected and arranged to prevent an indication of an impending collision until the correct indication is determined and displayed. In addition, these circuits also maintain the proper display for a sufficient period to allow the evasive maneuver to be accomplished.

For a better understanding of the invention, reference is made in the following description to the accompanying drawings, wherein like parts are indicated by like reference numerals, in which.

The present invention, although not limited thereto, is adapted to cooperate with the invention disclosed in the beforementioned U.S. Patent No. 2,991,463 which takes advantage of the fact that, in a collision warning system, warnings from objects extremely remote from the system could very easily be false alarms since the objects might turn aside a considerable time before they could arrive at the system.

In a preferred embodiment of the present invention, advantage is taken of the fact that, in general, the evasive maneuver to avoid a collision situation is that which will avoid an object moving toward the system along an essentially straight line course with the least change of course of the system. To this end, the present invention, in one of its preferred embodiments, provides an effective detection of the direction of the threatening object.

Figures 1, 2A:
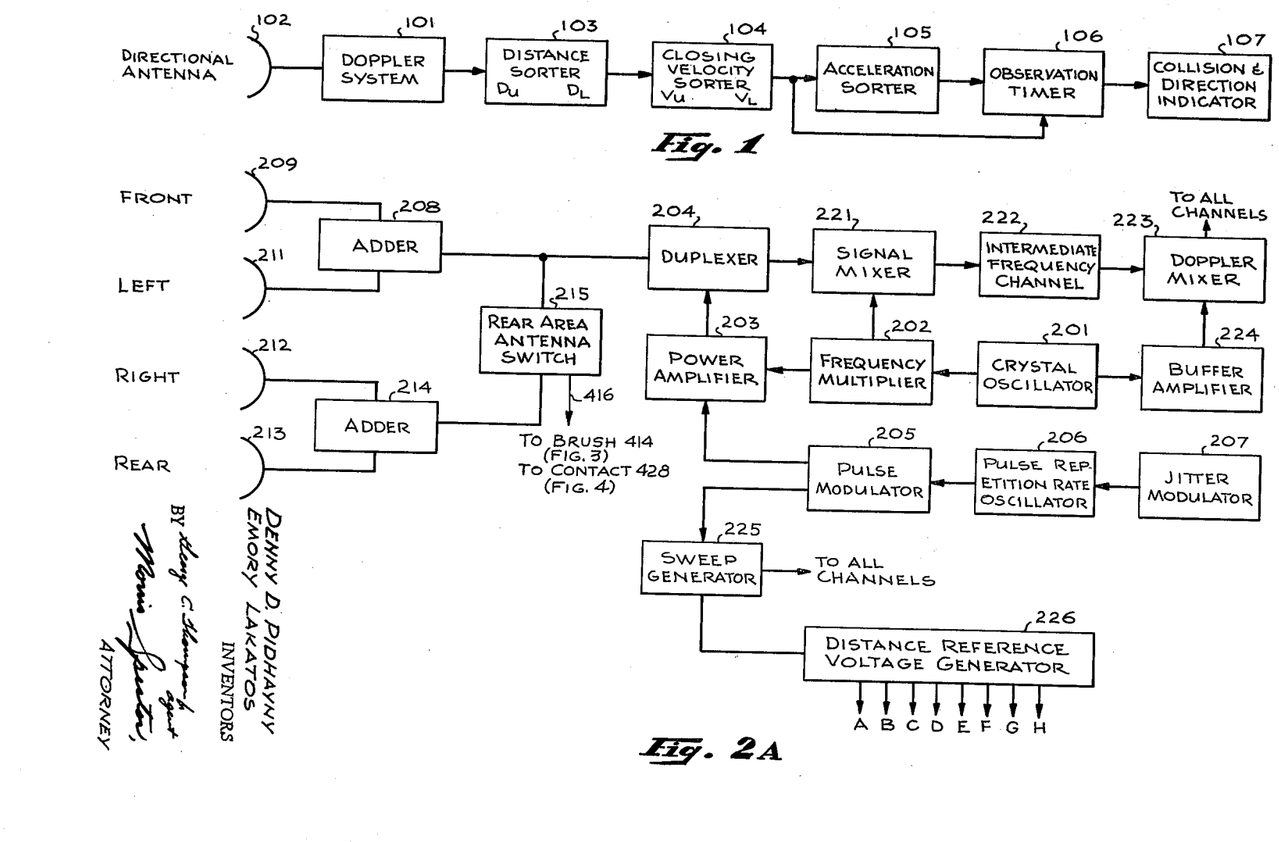
FIG. 1 shows, in block diagram form, the basic elements of the collision warning system usable with the invention.
FIGS. 2A and 2D depict, in block diagram form, a preferred embodiment of the system transmitting and receiving portions.

Apparatus 101 is shown in FIG. 1 and labeled Doppler System. Such a system operates upon the principle of the doppler effect, which states that the frequency of energy reflected directly back to an energy source from a relatively moving object will be changed by an amount proportional to the relative velocity between the source and that object. Moreover, the signals derived by the system also indicate the straight line distances between the energy source and the object moving relative thereto. Although such a system could be a radar system utilizing electrical energy to derive echo signals, the present invention is not limited thereto, since other forms of energy, such as light or sound could be used in accordance with the principles of the invention.

In order to direct the energy from the doppler system in a particular direction and receive the echo signals, a device 102 labeled Directional Antenna is provided. Elements 101 and 102 together make it possible to transmit radiant energy in a particular direction and derive echo signals from objects moving relative thereto with characteristics which are a function of or proportional to the distances and closing velocities of these objects relative thereto.

A device 103, labeled Distance Sorter, is shown connected to the doppler system 101, and this device serves to sort the echo signals in accordance with the distances of the objects with which they are associated. In at least this sense, the signals selected have a characteristic proportional to distance, and the device 103 provides signal information representing distance of the object. As indicated, the distance sorter 103 only allows signals to pass through from objects at distances lying in an interval or span of distances, the far extremity of this interval being defined by a maximum or upper distance, $D_U$, while the near extremity of the interval is defined by a minimum or lower distance, $D_L$, the values of all distances being measured outwardly from the system. Connected to the output of the distance sorter is a device 104, labeled Closing Velocity Sorter, which device only permits motion indicating signal information to pass through if their characteristics indicate that they were derived from objects having closing velocities lying in an interval of closing velocities defined by an upper or maximum value of closing velocity, $V_U$, to a lower or minimum value of closing velocity $V_L 1$. To the output of sorter 104 is connected a device 105, labeled Acceleration Sorter, for only passing signals whose characteristics indicate that their associated objects exhibit substantially no change in closing velocity.

The outputs from the velocity sorter 104 and acceleration sorter 105 are both coupled to a device 106 for determining the amount of time that signals entering directional antenna 102 are allowed to pass through the system; device 106 is labeled Observation Timer. This timer will only pass signals therethrough after the outputs from both acceleration sorter 105 and closing velocity sorter 104 are applied to it for a given interval of time. When this condition exists, the output of observation timer 106 is fed into an indicator device 107, which is labeled Collision and Direction Indicator.

From the foregoing description, it will be apparent that the system shown in FIG. 1 will transmit signals in a particular direction and will receive echo signals having characteristics indicative of the distances and closing velocities of the objects from which they were reflected. It will also be clear that only if these objects lie within a given range of distances and closing velocities, and if they also have a substantially constant closing velocity and remain within these ranges for the given time interval, will their associated signals ultimately pass through the observation timer and activate the collision and direction indicator.

Now, let it be assumed that a desired minimum warning time, $t_d$, is needed after signals pass through the system in order that a craft carrying the collision warning system may have sufficient itme to turn away from the associated objects on a collision course therewith. This desired minimum warning time would have two components, a maneuver time, $t_m$, for actually turning the craft, and a reaction time, $t_r$, to enable the pilot of the craft to see the collision warning and start to turn his craft. Let it further be assumed that the given time interval introduced by observation timer 106 is an observation time of $t_o$. From the foregoing, it will be apparent that $$t_d = t_m + t_r \quad (1)$$

Now, assuming that there is a given upper closing velocity $V_U$ that is the maximum closing velocity reasonably to be expected, we calculate the upper or maximum distance extremity $D_U$ of the distance range as follows:

$$D_U = V_U(t_d + t_o) \quad (2)$$

We then determine the lower distance extremity $D_L$ of the distance range by observing that an object traveling at velocity $V_U$ must be observed for a time at least equal to the observation time $t_o$. Hence $D_L = D_U - V_U t_o$ (3). Knowing the value of $D_U$ from Equation 2 and substituting same in Equation 3a, the value of $D_L$ then becomes the following equation:

$$D_L = V_U t_d \quad (3b)$$

By so fixing the upper and lower values of distance, we ensure that an object at the maximum distance $D_U$ and having a closing velocity of $V_U$ will be observed for a time $t_o$ in our collision warning system, and that our system will give a warning time of $t_d$ for all such objects. Next, we chose a value $V_L$ for the lower closing velocity as determined by the following equation:

$$V_L = K V_U \quad (4)$$

where K is a constant having a value less than one.

From the foregoing, it will be apparent that the span of closing velocities and distances have been so chosen that any object falling within these ranges for a time $t_o$ can only arrive at the system within a given time interval. This arrival time interval has a maximum value, $t_{max}$, when an object is at a distance $D_U$ and has a closing velocity of $V_L$. We thus find that:

$$t_{max} = D_U / V_L \quad (5)$$

and from Equations 2 and 4 we find:

$$t_{max} = V_U(t_d + t_o)/V_L = (t_d + t_o)/K \quad (6)$$

The minimum value, $t_{min}$, of this arrival time interval is obtained when an object has a closing velocity of $V_U$ and is at a distance $D_U$, since at lesser distances an object with the maximum closing velocity could not be observed for a time $t_o$ within the span of distances, as shown by Equations 2 and 3. Therefore:

$$t_{min} = D_U / V_U \quad (7)$$

and from Equation 2:

$$t_{min} = t_d + t_o \quad (8)$$

Since the signals must be observed for a time $t_o$, the maximum and minimum warning times, $W_{max}$ and $W_{min}$, are obtained by subtracting $t_o$ from Equations 6 and 8 to obtain, respectively:

$$W_{max} = [(t_d + t_o)/K] - t_o \quad (9)$$

and $$W_{min} = t_d \quad (10)$$

By choosing the limits of the intervals of closing velocities and distances in the above-described manner, we ensure the fact that at least the desired minimum warning time will always be obtained for any object within these intervals, the maximum warning time being equal to a value greater than $t_d$, as shown by Equation 9, since the ration between $V_L$ and $V_U$, is less than unity. However, as previously pointed out, too great a warning time is undesirable and K should be as close to unity as is compatible with the span of closing velocities for which the system must be designed.

Now, the operation of the collision indication system of FIG. 1 will be reviewed. The antenna and doppler system illuminate a given sector of space and derive from objects bearing various modes of relative motion echo signals whose characteristics are indicative of the distances and closing velocities of the objects. Due to the directivity of the antenna, signal information depicting the presence of an object embraced by a range of directions is obtainable and these signals are already sorted as to the direction of their associated objects. The various sorters now proceed to process the echo signals, only allowing those signals to pass which are associated with objects lying within a distance range $D_U$ to $D_L$, which are moving with a substantially constant closing velocity falling within the range of closing velocities from $V_U$ to $V_L$, and with all sorting outputs being delayed for a time to check against false return signals. With K, $t_o$ and $t_d$ given, and with $V_L$, $D_U$ and $D_L$ calculated as noted above, every signal passing through to the indicator will give an indication that an object will arrive at the system within a time interval from its reception of from $t_d=t_o$ to $$V_U(t_d+t_o)/V_L$$

thereby giving a minimum warning time of at least $t_d$.

It should be pointed out that FIG. 1 does not show the optimum system that could be devised, but it does illustrate the basic principles of the invention, namely, that using a limited range of distances and closing velocities will minimize the effects of noise and make it possible to use an efficient predictor, and that the use of such limited ranges further eliminates needless alarms and establishes the order or priority of the threats. It should also be noted that the collision indicator could give a collision warning signal to the pilot of the craft bearing the system, or it could be used to turn the craft automatically in response to signals passing through the system.

Figure 2B:
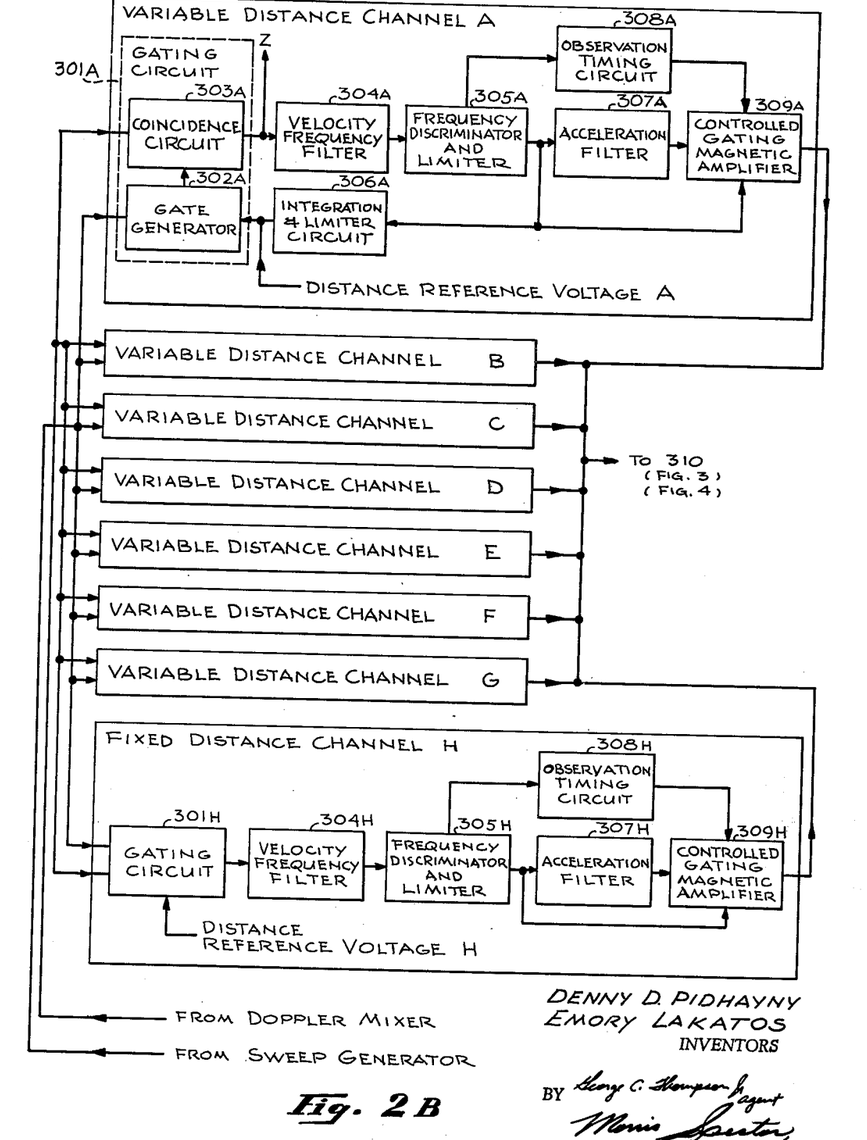

While the embodiment shown in FIG. 1 has been useful in illustrating the basic principles of the invention, it is clearly not the optimum system that could be devised. For example, in accordance with a preferred form of the invention, means are provided for illuminating several directions and covering a wide band of closing velocities. A single doppler radar system in common with many sorting channels and antennas is, therefore, used for this purpose, and a simplified indicator system is also utilized. It is also within the purview of the present invention to provide additional elements to make the invention even more useful to craft bearing it. For example, in addition to determining whether or not an object is coming toward the system on a collision course, the operator of the craft might also want to know of the presence of any object that was either very close to the craft and moving, or at a considerable distance therefrom and stationary. In addition, some sort of audio tone signals, as well as visual signals, could be provided in order to warn of danger even when a pilot was not looking at the instrument panel. In FIGS. 2A and 2B is shown a preferred embodiment of the invention which performs all of the foregoing functions with a minimum of electronic components and weight. Since all of the elements shown in these figures can be filled by structures well known in the art or clearly described herein, they are illustrated in block diagram form so as to avoid obscuring the invention.

Referring more specifically to FIG. 2A, there are shown the transmitting, receiving, and antenna portions of a pulsed, doppler radar system to be used with the preferred embodiment of the invention. Such elements are well known in the art and many other types of such devices could be used here; however, the particular transmitter shown is especially simple and light, and its use is considered desirable in the system. This transmitter generates pulses of radiant energy at an extremely stable frequency, and it includes a device 201 labeled Crystal Oscillator, for generating an extremely stable reference frequency. A crystal oscillator utilizing a 5670 tube for producing a 60 mc. signal output, with a crystal oven to minimize the effects of temperature change and insure temperature stability, would suffice here. One output from this oscillator is then fed into a Frequency Multipler 202, such as a multi-stage exciter utilizing GL 6442 tubes. A suitable exciter would multiply the 60 mc. input thereto by 48 up to 2880 mc., and a portion of this 2880 mc. output signal would then be mixed in the exciter with the 60 mc. input signal to produce a frequency of 2940 mc. This last frequency is then amplified in a Power Amplifier 203 and supplied to a Duplexer 204 for isolating the receiving portion of the system from the transmitting portion.

The pulses driving the power amplifier 203 are generated in a Pulse Modulator 205 and preferably have a duration of 0.1 $\mu$sec., and this modulator is excited by a Pulse Repetition Rate Oscillator 206 which produces 20 kc. pulses. Oscillator 206 is, in turn, made to vary slightly in frequency by a Jitter Modulator 207, in order that confusion with other craft using the system shall be minimized. Thus, it will be apparent that the output of power amplifier 203 is a series of 0.1 $\mu$sec. pulses recurring at a rate in the vicinity of 20 kc. and having a carrier frequency of 2940 mc. These pulses then pass through the duplexer 204 and through an Adder 208 to a pair of Antennas 209 and 211, respectively, labeled Front and Left. Each of the antennas 209 and 211 will cover approximately 90° in azimuth and 15° in elevation; however, the front antenna will cover only the forward 90°, while the left antenna will cover only the left 90°, relative to the craft bearing the collision indication system. The adder device 208 serves to distribute the energy from the transmitter equally between the two antennas; however, it should be understood that if a single antenna were used to cover the entire 180°, no such adder device would have to be used. The pair of antennas 209 and 211, therefore, are connected together through the adder and cover what we shall call the front area.

In covering the rear area, a similar pair of antennas, 212 for the right, and 213 for the rear, are shown and these are interconnected through an Adder 214, which is, in turn, connected to a Rear Area Antenna Switch 215 for either blocking or passing energy to or from these antennas.

Signals reflected from objects moving relative to the system will pass through the antennas, adders, and the duplexer to a Signal Mixer 221. These reflected signals will be at a frequency of 2940 mc. plus or minus the doppler frequencies introduced by the closing velocities between the objects and the system. Into signal mixer 221 is also fed the 2880 mc. output from frequency multiplier 202 to be subtracted from the reflected signals, causing the output of this mixer to be 60 mc. plus or minus the doppler frequencies. This output is then amplified in an Intermediate Frequency Channel 222 and is then fed into a Doppler Mixer 223. Also fed into the doppler mixer is a 60 mc. signal derived from a Buffer Amplifier 224 into which, in turn, is fed a 60 mc. output from the crystal oscillator 201. The 60 mc. signal from the buffer amplifier will be subtracted from the intermediate frequency signal in the doppler mixer 223, and the difference will, therefore, be a bipolar, video pulse train, which contains the doppler frequency signal.

Referring now to the pulse modulator 205, it will be seen that it is also used to activate a Sweep Generator 225, for producing a linear sweep saw tooth voltage synchronous with the pulse repetition rate of 20 kc., and the output of the sweep sawtooth generator is also fed into a Distance Reference Voltage Generator 226 for producing a series of D.-C. voltages labeled A—H. The voltages from generator 226 could also be derived from any suitable source of D.-C. voltage.

From the foregoing description of FIG. 2A, it will be apparent that the elements there shown will cause a train of 20 kc., 0.1 $\mu$sec. pulses, with a carrier frequency of 2940 mc., to be sent out through the various antennas. Further, any such pulses reflected from a relatively moving object will be received through the various directive antennas, amplified, and mixed with the reference frequency to produce doppler frequency signals indicative of the closing velocities of the objects. Since a sawtooth sweep voltage is simultaneously produced in synchronism with each transmitted pulse, this sweep voltage will, therefore, serve to fix the time that a transmitted pulse was sent out by the system; and since the time between the sending out of a transmitted pulse and the reception of a reflected pulse from an object will be directly proportional to the distance of the object from which the pulse was reflected, it will be seen that the sweep voltage can be used in conjunction with the received, reflected signals to determine the distance of the object. Further, since the sweep voltage is linear, its instantaneous value will be directly proportional to distance; therefore, it is possible to use the sweep voltage to derive a series of D.-C. voltages, each of which will represent a given object distance from the system, and this is done in the distance reference voltage generator 226.

There are, then, three sets of outputs from the portion of the system shown in FIG. 2A, a bi-polar video pulse train containing doppler frequencies which indicate the closing velocities of objects moving relative to the system, a sweep voltage having an amplitude directly proportional to the elapsed time between the transmitted pulses, and a series of distance reference voltages A—H, each of which has a different value and represents a given distance from the system. Therefore, all of the information needed to sort the reflected signals in accordance with the closing velocities of the objects from which they were reflected, and the distances of the objects from the collision indication system, is present in the output from the doppler radar system shown in FIG. 2A. All of this information is now transferred to the portion of the system shown in FIG. 2B, where it is sorted and a determination of whether or not a collision course exists is made.

Examining now channel A in FIG. 2B, it is designed, by way of example, to track objects at distances from the collision warning system of 25,600 to 20,800 ft., and at closing velocities of 1600 to 1300 ft./sec. Included in this channel is a Gating Circuit 301A for passing signals only within the range of distances for which this channel is designed, and it includes a Gate Generator 302A for generating a range gate approximately 0.2 $\mu$sec. long, which is the equivalent of almost a 100 ft. band of distances. By passing such a small band of distances, noise is minimized. A suitable gate generator could be an ordinary blocking oscillator with a pulse forming network in its anode circuit. One input into gate generator 302A is the distance reference voltage A derived from distance reference voltage generator 226 in FIG. 2A, and this voltage biases the blocking oscillator or gate generator and causes it to be normally inoperative. Another input to the gate generator 302A is the sweep voltage from sweep generator 225 in FIG. 2A, and only when the sweep voltage rises to a value sufficient to overcome the bias of distance reference voltage A will the gate generator produce its 0.2 sec. gate, the bias of voltage A being such that the initial operation of the gate will correspond to 25,600 ft.

The output gate from gate generator 302A is applied across a Coincidence Circuit 303A, such as a bridge circuit, and also applied across this circuit is the signal input from the doppler mixer 223 of FIG. 2A. Coincidence circuit 303A will produce an output only when a signal from the doppler mixer is present and when a gate from its associated gate generator is also present. Upon the coincidence of these two inputs, an output is produced from the coincidence circuit and applied to a Velocity-Frequency filter 304A. This element is a doppler filter designed to pass only those doppler frequencies corresponding to 1600 to 1300 ft./sec. Since the doppler frequency is equal to twice the closing velocity of an object divided by the wave length of the carrier, and since the carrier of the transmitter shown in FIG. 2A has a frequency of 2940 mc., or approximately one third of a foot, it will be apparent that the doppler frequency is equal to six times the closing rate. Therefore, velocity-frequency filter 304A is so designed as to pass only signals having frequencies of between 9,600 and 7,800 c.p.s.

If the incoming signal from the doppler mixer occurs within the proper interval of distances as governed by the gating circuit, and also falls within the proper interval of velocities as determined by the velocity-frequency filter, signal information passes through that filter into a Frequency Discriminator and Limiter 305A, where it is converted into a D.-C. signal. One output of 305A is then applied back through an Integration and Limiter Circuit 306A into gate generator 302A. The output of this integration and limiter circuit is of opposite polarity from that of distance reference voltage A, and serves to change the position of the gate generated by gate generator 302A by lowering the bias thereon, with the result that the gate will now appear sooner and thereby serve to track oncoming objects.

A second output from the frequency discriminator is applied to an Acceleration Filter 307A which differentiates and smooths the output from the frequency discriminator and limiter 305A so as to determine its rate of change. Since rate of change of velocity is equal to acceleration, it will be clear that the output of filter 307A will be the closing acceleration of the object relative to the collision indication system.

Another output from the frequency discriminator and limiter circuit 305A is applied to an Observation Timing Circuit 308A for introducing a limited predetermined observation (averaging) period of at least $t_0$ into the circuit in order to minimize noise as much as possible. A suitable timing circuit would be a 3-second, one-shot multivibrator triggered by the output from circuit 305A.

Next is provided a Controlled Gating Magnetic Amplifier 309A having three input windings into which are respectively fed three signals, the output from observation timing circuit 308A, the output from acceleration filter 307A, and the output from frequency discriminator and limiter 305A. This controlled gating magnetic amplifier is so biased that it will enhance passage of a signal only when there is an input thereto from the frequency discriminator-limiter circuit 305A (indicating the presence of a reflected signal from a moving object within the range of distances and velocities), after the signal from delay circuit 308A has terminated, and only if the output from acceleration filter 307A is substantially zero (indicating that a relatively moving object is on a collision or a near-collision course). When all of these conditions have been satisfied, amplifier 309A produces output signal information to be applied to a Relay 310.

Figure 3:
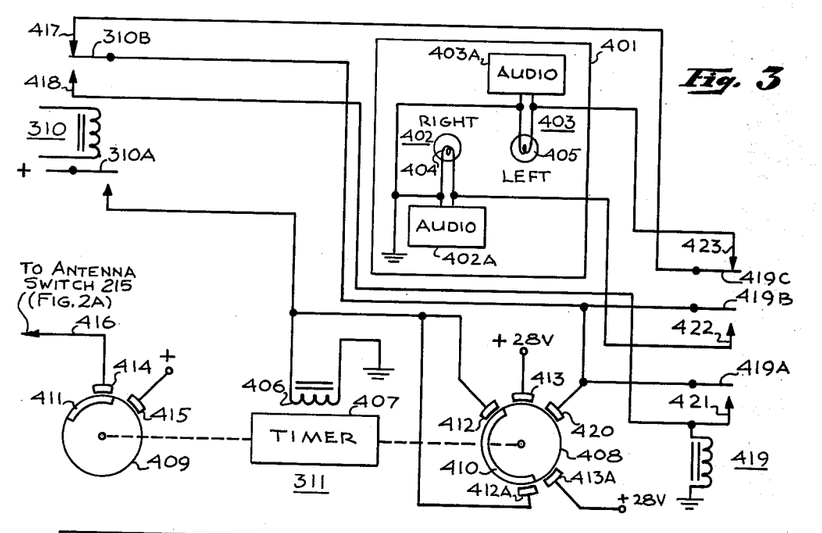
FIG. 3 is a diagrammatic view of one form of indicating control embodying this invention.

Referring now to FIG. 3, there is shown one indicator control arrangement embodying this invention. The indicator control arrangement comprises a control panel 401 provided with a pair of indicators 402 and 403 having right and left legends, respectively, for instructing the operator of the vehicle to maneuver one direction or the other depending upon which indicator is illuminated. The right indicator 402 is provided with a lamp 404 and an audio annunciator 402A and left indicator 403 is provided with a lamp 405 and audio annunciator 403A. These lamps and annunciators are selectively illuminated by a suitable circuit such as described hereinafter.

When the relay 310 has an output signal applied thereto from the amplifier 309A, this relay becomes energized to move its movable contacts 310A and 310B. The contact 310A is a normally open contact which becomes closed upon energization of the relay 310 to apply a voltage, such as 28 volts, from a positive source of power (not shown) to a control device such as a motor timer 311. The energy from the power source applied to the motor timer 311 is applied over the now closed contact 310A to one terminal of an energizing winding 406 of the motor timer, with the other winding terminal being connected to the ground connection common with a negative terminal of a source of power (not shown). With energy now applied to the motor timer 311, its armature 407 begins to turn causing a pair of movable contact members 408 and 409 to be rotated in a clockwise direction. The contactor members 408 and 409 can be of the drum controller type with suitable current carrying portions along a portion of the periphery of each. For example, the contactor 408 is provided with a current carrying strip 410 along a portion of its periphery and having one length while the contactor 409 is provided with a current carrying strip 411 along a portion of its peripheral surface having a different length. In order for an indication of a collision to be given, it is necessary for the relay 310 to remain energized sufficiently long to allow the motor timer armature 407 to rotate the contactor 408 to a position where its current carrying strip 410 can complete a circuit between two fixed brush terminals 412 and 413. The brush terminal 413 is connected to the positive terminal of the source of power (not shown) and also connected to the brush terminal 412 by the strip 410 to provide a holding circuit for the motor timer 311. This circuit can be traced from the positive source terminal, the brush terminal 413, through the strip 410 to the brush terminal 412, through the winding 406 of the motor timer 311, to ground. The strip 410 is made sufficiently long on the periphery of the contacting member 408 and with the cooperation of additional brush terminals 412A and 413A the motor timer continues to run for a time period such as, for example, 15 seconds and returns to its starting position.

While the holding circuit of the motor timer is being established; the contractor 409 is moving its strip 411 to a position connecting a pair of brush members 414 and 415 together. The brush member 414 is connected through a conductor 416 to the rear area antenna disabling switch 215 (FIG. 2A) which is activated to disable the rear antennas in response to the application of a potential to the conductor 416. The brush member 415 is connected to a positive terminal of a source of power and, therefore, with the current carrying strip 411 positioned to contact the brush members 414 and 415, the rear area sensing members or antennas become disabled.

With the first energization of the relay 310 causing the movement of the movable contact member 310B from its normal contact position contacting the fixed contact point 417 to its contact position contacting the fixed contact point 418, two conditions are provided. The first condition is the interruption of any possible momentary energizing circuit of the left indicator 403 and the second is the initial preparation of an energizing circuit for a left indicator circuit interrupter and right lamp hold-on relay 419. The relay 419, however, at this time cannot be energized until the motor timer has rotated sufficiently far for the contact strip 410 to make contact with the fixed brush 420. In the meantime, the interruption of the rear area antennas caused by the contact of 409 may, or may not, interrupt the incoming signal to the relay 310 depending upon whether the signal is being received from the rear area or the front area.

If we assume first that the signal is being received from the front area, it can be seen that the relay 310 will remain energized sufficiently long to allow the movable contactor 408 to supply power to the contact brush 420 by allowing the strip 410 to simultaneously contact the brushes 413 and 420. With the relay 310 energized, a circuit is now complete for energizing the relay 419. This circuit can be traced from the source terminal through the brush 413, the terminal strip 410, the terminal brush 420, the movable contact 310B in energized position to contact the fixed contact 418, the winding of the relay 419, to the ground terminal. Energization of the relay 419 causes its movable contact members 419A, 419B and 419C to move to their opposite positions with the following results. The contact member 419A closes with the contact point 421, providing a hold or stick circuit for the relay 419, to maintain this relay energized for the operating period of the motor timer 311. This circuit can be traced from the source terminal through the brushes 413 and 420 interconnected by the strip 410, the movable contact 419A, the fixed contact 421, the winding of the relay 419 to ground. Movement of the movable contact 419B to a position contacting the contact point 422 provides an energizing circuit for the right indicator lamp 404 of the right indicator 402. This can be traced from the positive source terminal through the brush 413, the contact strip 410, the brush 420, the movable contact member 419B, the fixed contact point 422, the indicator lamp 404 and audio annunciator 402A of the right indicator 402, to ground. The right indicator display, therefore, indicates to the operator of the vehicle that an immediate turn to the right must be executed in order to avoid a collision with a target in the area to the front and left of the vehicle. In order to prevent a possible false indication, the movable contact 419C actuated by the relay 419 is provided for interrupting the circuit of the left turn light 405 and audio annunciator 403A during the period in which the signal is being received from the front and left areas as determined by the disabling of the rear area antenna. The movable contact point 419C interrupts the circuit by moving away from the fixed contact point 423.

Let us assume now that when the contact member 409 disables the rear area antennas that the signal being delivered to the relay 310 also becomes interrupted. When this occurs, the relay 310 will return to its original state with the movable contact member 310A being opened and the movable contact member 310B being closed to the contact point 417. Interruption of the original energizing circuit for the winding 406 of the motor timer 311 by the contact member 310A has no effect since the holding circuit formed by the contact member 408 is now complete. Movement of the contact point 310B to the fixed contact point 417, however, serves two purposes. It prevents the energization of the lamp hold-on relay 419, and, at the same time, prepares a possible energizing circuit for the left turn indicator lamp 405 and audio annunciator 403A.

As soon as the motor timer 311 has caused the movable contact member 408 to move the strip 410 into contact with the brush 420, an energizing circuit for the lamp 405 becomes established. This circuit can be traced from the source terminal through the brush 413, the contact strip 410, the brush 420, the movable contact 310B, contact point 417, the movable contact 419C of this now de-energized relay 419, the lamp 405 and audio annunciator 403A of the left turn indicator 403, to ground. The movable contact members 419A and 419B at this time prevent the establishment of a holding circuit for the relay 419 and an energizing circuit for the right turn indicator 402, respectively.

The left turn indicator lamp 405 annunciator 403A are maintained energized for the full time period established by the timer 311 by the fact that the movable contact member 408 maintains the energizing circuit until the timer has expended its time period. At this time, the contactor 408 interrupts the energized circuit for the lamp 405 by moving the strip 410 from under the brush 420 and the brushes 412A and 413A cause the hold circuit for the motor timer 311 to remain complete until the timer is in position for a new operation.

Figure 4:
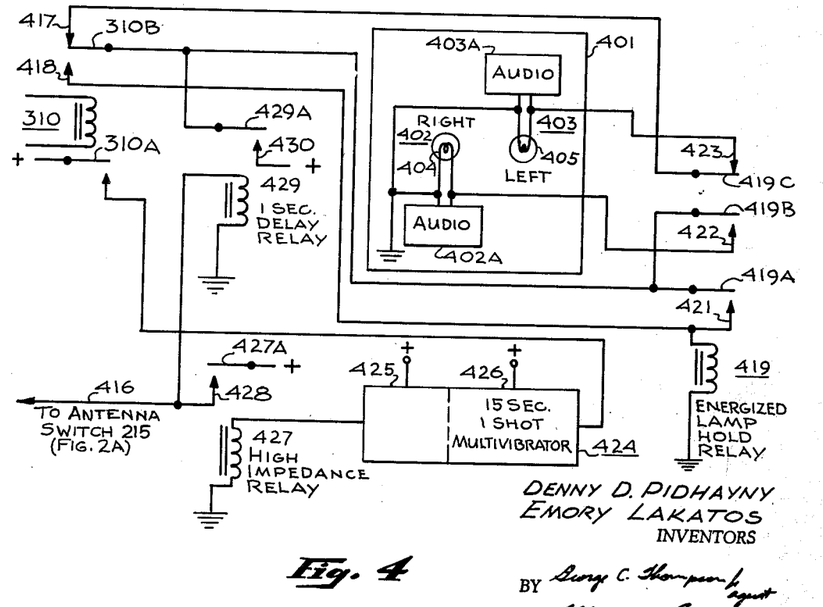
FIG. 4 is a diagrammatic view of a different indicator circuit arrangement embodying this invention.

The embodiment shown in FIG. 4 utilizes the relay 310 as a sensing device and in place of the motor timer 311 a suitable timing control device, such as a one-shot multivibrator 424, of any well known type having, for example, a 15 second period is used. If we again assume that the relay 310 is energized by a signal causing its contact 310A to become closed and its contact 310B to move into contact with the contact point 418, it can be seen that the now closed contact 310A applied a keying bias voltage to the one-shot multivibrator 424 causing its normally energized side 425 to become de-energized, and its normal de-energized side 426 to become energized. The exact circuit of the multivibrator 424 is not shown since any suitable, well-known one shot multivibrator can be used. De-energization of the portions 425 and energization of the portion 426 of the multivibrator 424, in turn, causes a control member such as a high-impedance relay 427 to become energized causing its contact member 427A to be closed with the contact point 428 to provide for disabling of the antenna switch 215. At the same time, energy is applied to an indication delay device such as a one-second delay relay 429, causing its movable contact member 429A to become closed with the contact point 430, after a suitable one-second delay period. The one-second delay period provided by the relay 429 is for the purpose of preventing momentary false indications under simultaneous indication system operation.

With the contact member 429A now closed and, if we assume that the received signal is being received from the front and left antennas, it can be seen that an energizing circuit is established for the relay 419. This circuit can be traced from the positive source of power through the fixed contact point 430 and movable contact 429A, of relay 429, the movable contact point 310B, the fixed contact point 418, the winding 419 of the right indicator hold-on relay to ground. Energization of the relay 419 causes its movable contact points 419A, 419B and 419C to be moved to their opposite positions. The circuits associated with the contact members 419A and 419B become completed, and the circuit associated with the contact member 419C becomes interrupted. Closure of the movable contact member 419A with its fixed contact point 421 provides a hold circuit for the relay winding of the relay 419. This circuit can be traced from the positive source of power through the fixed contact point 430, the movable contact point 429A, the movable contact member 419A, the fixed contact point 421, relay winding of the relay 419 to ground.

At the same time, the movable contact member 419B becomes closed with the fixed contact point 422 causing an energized circuit for the right indicator lamp 404 and audio annunciator 402A. This can be traced from the source of power over the fixed point 430, the movable contact member 429A, the movable contact member 419B, the fixed contact point 422, the indicator lamp 404 and annunciator 402A to ground. The contact member 419C at this time interrupts any possible energizing circuit for the left turn indicator lamp 405 to prevent a false indication. Even if the relay 310 should become de-energized in response to a loss of signal during an evasive maneuver, causing its movable contact 310B to become closed with its fixed contact 417, the left turn lamp could not be energized, and the right turn lamp would be maintained energized for the time period established by the one-shot multivibrator 424. Since the relay 419 controls each of these possibilities, and it, in turn, remains energized over the contact 429A of the one-second delay relay 429, it can be seen that the multivibrator in maintaining the high-impedance relay 427 energized for a time period also maintains the relay 429 energized for the same time period causing the display to be activated as described hereinbefore.

If we now assume that the signal being received by the antennas is actually received over the rear area antennas, the energization of relay 310 closing its contact member 310A causes the multivibrator 424 to shift its state from 425 being conductive, to 426 being conductive. In response to this action, the high-impedance relay 427 becomes energized, closing its contact member 427A with the contact point 428 causing the antenna switch 215 to disable the rear area antennas. This action naturally results in de-energization of the relay 310, however, in view of the fact that the multivibrator 424 has already been keyed and shifted in its conductive state, the high-impedance relay 427 will be maintained energized for the full 15 seconds multivibrator period. It is pointed out also that approximately simultaneously with the de-energization of the rear area antennas, energy is applied to the one-second delay relay 429. This one-second delay period is sufficiently long to allow the relay 310 to become de-energized in response to de-energization of the rear area antennas before power is applied to the indicator circuit as described hereinafter.

At the time the contact member 429A of relay 429 becomes closed with the fixed contact point 430, the relay 310 will have returned to its original de-energized state causing its contact member 310B to contact the fixed point 417. As a result, the left turn indicator turn lamp 405 and audio annunciator 403A become energized over a circuit that can be traced from the positive source terminal over the fixed contact point 430, movable contact member 429A, the movable contact member 310B, the fixed contact point 417, the movable contact member 419C, the fixed contact point 423, the lamp 405 and annunciator 403A, to ground. Since the one-second delay is introduced in the energizing arrangement for the indicator portions of this circuit, which is sufficient time to allow the relay 310 to be energized and again de-energized in response to deactivation of the rear area antennas, the relay 419 never becomes energized in response to a rear area target in view of the fact that no power is applied to its energized circuit prior to the de-energization of relay 310. With the relay 419 remaining de-energized, its movable contact point 419B assures de-energization of the right turn indicator 402 and audio annunciator 402A and elimination of any false indication.

It will thus be apparent that by means of this relay, or the motor timer, and antenna switching arrangement, it is possible to sense whether an incoming signal came from either the front or the rear areas, and the appropriate turn can be indicated. The "Rules of the Road" over airports are that if threats come from the front or left of a craft, the craft should turn to the right to avoid them; and if threats come from the right, the craft must turn to the left to avoid them. There is no rule as to threats from the rear, so it is proposed that the pilot turn to the left to avoid them. Thus, our indicator system is simplified, since only turn right and left indicators are needed to turn from threats coming from all four directions.

Variable distance channels B—G all operate in exactly the same way as channel A, except, of course, that they track objects at different ranges of distance and velocity, and each channel has its own correspondingly lettered distance reference voltage from generator 226 in FIG. 2A. Thus, the range of distances of channel B is from 20,800 to 16,900 ft. at a range of closing velocities from 1300 to 1000 ft./sec.; channel C has a range of distances from 16,000 to 13,000 ft. at 1000 to 700 ft./sec.; channel D tracks objects from 11,200 to 9100 ft. at 700 to 500 ft./sec.; channel E tracks objects from 8000 to 6500 ft. at 500 to 350 ft./sec.; channel F tracks objects from 5600 to 4550 ft. at 350 to 245 ft./sec.; and channel G tracks objects from 3920 to 3185 ft. at 245 to 165 ft./sec.

A Fixed Distance Channel H is also provided for warning of objects located from 2640 to 2145 feet and at relative velocities of 165 to 120 ft./sec. It will be noted from FIG. 2B that this channel possesses a Gating Cirsuit 301H, a Velocity-Frequency Filter 304H, a Frequency Discriminator-Limiter 305H, an Acceleration Filter 307H, an Observation Timing Circuit 308H, and a Controlled Gating Magnetic Amplifier 309H. All of these elements operate in ways similar to their correspondingly numbered elements in channel A; however, channel H is designed to operate at different closing velocities and distances than channel A and has its own distance reference voltage H applied to its own gating circuit. The main difference between this channel and the variable distance channels A—G is that there is no feedback from the output of frequency discriminator-limiter 305H back to the gating circuit 301H. This means that the gate output from the gating circuit of this channel will remain at a fixed distance. In order to cover the desired range of distance, the gate produced by gating circuit 301H is a 1 $\mu$sec. gate, in contrast to the 0.2 $\mu$sec. gates of the variable distance channels. Such a 1 $\mu$sec. gate will cover an approximate distance range of 495 feet, and since no further distance range is desired, the gate need not be variable.

It will be seen from the foregoing that a collision indication system has been provided that will indicate the presence of all objects heading in a collision course toward a craft bearing the system including close objects at any closing velocity and objects having closing velocities lying within a band of closing velocities from 120 and 1600 ft./sec., and in a span of between 2145 and 25,600 ft. from the craft. Also, the pilot of the craft will be told in which direction to turn to avoid the threat. Moreover, utilizing three regulated, chopper-type, magnetic amplifier power supplies, and transistors, and multipurpose tubes whenever possible, the system of the invention as shown in FIGS. 2A and 2B, exclusive of the antennas, will weigh less than 78 pounds and can be contained in a volume of 0.84 cu. ft. Therefore, this collision warning system accomplishes all of the objects previously set forth.

A word should now be said as to how the various ranges of distance and velocity were obtained. It was first determined that an aircraft making a 10-second turn to the right away from objects approaching from the left or front, and to the left from objects approaching from the right or rear, at an acceleration of twice that of gravity ($2g$), would clear the oncoming objects by a minimum of 800 ft.; and if the turn were made at 0.6 $g$. for 10 seconds, the clearance would always be at least 100 ft. With regard to channel A, it was decided that the maximum closing velocity that might reasonably be encountered in normal conditions of aircraft flight, $V_U$, was 1600 ft./sec., corresponding to almost 1100 miles per hour. Then, since there was a 3-second observation time, $t_o$, in the equipment, since a 3-second pilot reaction time, $t_r$, was desired as a safety factor, and since a 10-second interval, $t_m$, was needed to turn the craft, the maximum distance, $D_U$, was determined from Equations 1 and 2 by multiplying 1600 ft./sec. by 16 seconds, to arrive at 25,600 ft. The lower distance, $D_L$, was determined from Equations 1 and 3 by multiplying 13 seconds by the maximum velocity of 1600 ft./sec. to arrive at 20,800 ft. At that distance, a minimum warning time of 13 seconds was obtained at the maximum closing velocity. Now, bearing in mind that the smaller the interval of closing velocities was, the better the signal-to-noise ratio would be, a lower closing velocity, $V_L$, was chosen at 1300 ft./sec., resulting in a doppler frequency range of 9600 c.p.s. to 7800 c.p.s. for this channel.

This lower closing velocity of 1300 ft./sec. now became the upper closing velocity, $V_U$, of channel B, and the entire process was repeated for this channel to arrive at the values noted above. The process was again repeated for channels C to H. However, in no instance was the K of Equation 4 less than 0.7 when the lower closing velocities were determined. Thus the entire band of closing velocities from 120 ft./sec. to 1600 ft./sec. was continuously covered, insuring that no object within that band would be overlooked by the collision warning system. Further, each channel only passed signals from objects on collision courses that would arrive at the collision warning system within minimum time of 16 seconds to a maximum time of 25.8 seconds after their signals arrived at the system, thereby ensuring that noise was minimized and that the warning times were the desired minimum of 13 seconds.

Although the system shown in FIGS. 2A and 2B distinguishes between objects having closing velocities directed toward the system from those directed away from the system by having tracking gates which only can follow oncoming objects, other ways of distinguishing such objects are possible. For example, the acceleration sorting circuits shown in FIGS. 1 and 2B could be so biased as to pass only signals corresponding to oncoming objects. Thus, in a modified system in which the distance gates were fixed in position, such a biased acceleration sorter would be useful. Further, since the number of oncoming objects is so much greater than the number of receding objects, a fixed gate system that failed to distinguish between such objects would also be a useful one.

The presently disclosed system may also be modified in numerous other ways so long as the principles previously outlined are followed. For example, the number of channels used could be varied, either the span or interval of closing velocities or the interval of distances could be overlapping or continuous, the observation or averaging time, $t_o$ of each channel could be different, the various gates could have differing durations, etc.

Many such changes in the elements and parameters of the various channels could be made, provided only that every object on a collision course within the desired band of closing velocities is indicated in sufficient time to avoid it, and that noise is sufficiently minimized so that a usable signal can be obtained.

It should be understood that many types of antennas could be used other than those described herein. Also, any number of antennas could be used.

It should be understood that the present invention is not limited to aircraft, since land vehicles will also find it useful, and that the disclosed system could use the collision indication signal to turn the craft automatically, where this service was desired.

It should also be understood that the observation timing circuits shown in FIGS. 1 and 2B could be replaced by switching devices, well known in the art, which would only permit the antennas to transmit energy for limited time intervals, provided that these intervals gave sufficient averaging time to obtain a usable signal. Similarly, many of the other elements described in the foregoing could be replaced, but these and the many other variations that may occur to those skilled in the art will not alter the basic principles of the invention; and it is these principles which have made it possible to meet, practically speaking, all of the requirements previously noted and provide, for the first time, a practical, useful collision indication system.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

The embodiments of the invention in which an exclusive property or privilege is claimed are defined as follows:

1. In a collision warning system capable of determining the imminent dangerous relative approach of an object and the system, a plurality of object return signal sensing means, switching means for deactivating at least one of said plurality of sensing means, control means responsive to return signals sensed by said sensing means and having an output for selectively activating said switching means, warning indication means conected to said output of said control means for providing information capable of preventing a dangerous relative approach of the object and system, holding means for controlling said control means to provide a warning indication for a definite period of time after warning indication means activation irrespective of subsequent loss of return signal.

2. In a collision warning system capable of determining the relative dangerous approach of an object and the system comprising: a plurality of sensing means for detecting object return signals, said plurality of sensing means providing substantially full azimuth detection coverage with each of said sensing means covering a separate area, receiving means responsive to the signal sensed by such sensing means, a first means responsive to signals received by said receiving means for interrupting the response of said receiving means to a portion of said plurality of sensing means, control means connected to said first means and responsive to actuation thereof, warning indication means forming a portion of said control means for selectively providing a warning indication upon actuation of said control means, and holding means connected to said first means and to said control means for controlling said control means for a definite period of time after warning indication means activation irrespective of subsequent loss of return signal and direction of signal reception.

3. In a collision warning system of the type adapted to pass a signal derived from an object moving relative to the system, an evasive maneuver direction determining arrangement comprising: a plurality of sensing devices receptive of signals from different directions; first means operable in response to a signal received by one of said sensing devices, indicating a collision threat, for selectively interrupting said signal from at least one of said plurality of sensing devices; display means; control means connected to said display means and to said first means and responsive to actuation thereof to provide a display indication for a definite period of time following initial activation of said display regardless of subsequent loss of said signal; and relay means in said first means for holding said display unchanged during said period.

4. In a collision warning system of the type adapted to pass a signal derived from an object moving relative to the system, an evasive maneuver direction determining arrangement comprising: a pair of sensing devices receptive of signals from different directions; first means operable in response to a signal received by one of said sensing devices, indicating a collision threat, for selectively and sequentially interrupting said signal from at least one of said pair of sensing devices; display means; control means connected to said display means and to said first means and responsive to actuation thereof to provide a display indication for a definite period of time following initial activation of said display regardless of subsequent loss of said signal; and second means connected to said first means and to said display means for preventing any indication display until an indication display signal indicating said collision threat has been sequenced in said first means.

5. In a collision warning system of the type adapted to pass a signal derived from an object moving relative to the system, an evasive maneuver direction determining arrangement comprising: a plurality of sensing devices receptive of signals from distinct directions, a first means connected to said sensing devices and operable in response to a signal indicating a collision threat for selectively interrupting said signals from at least one of said plurality of sensing devices and causing a display indication, holding means connected to said first means for controlling said first means to hold its display indication for a definite period of time following initial activation of said display irrespective of subsequent loss of signal, and second means connected to said first means and including time sequencing means for preventing any indication display until an indication display signal indicating said collsion threat has been determined.

6. In a collision warning system of the type adapted to pass a signal derived from an object moving relative to the system, an evasive maneuver direction determining arrangement comprising: a plurality of sensing devices receptive of signals from distinct directions, a first means connected to said plurality of sensing devices and operable in response to a signal indicating a collision threat for selectively interrupting said signal from at least one of said plurality of sensing devices and causing a display indication, holding means connected to said first means and responsive to actuation thereof for controlling said first means to hold its display indication for a definite period of time following initial activation of said display irrespective of subsequent loss of signal, and second means connected to said first means and including time delay means for preventing any display indication until an indication display signal indicating said collision threat has been determined.

7. In a collision warning system of the type adapted to pass a signal derived from an object moving relative to the system, an evasive maneuver direction determining arrangement comprising: a plurality of sensing devices receptive of signals from distinct directions, a first means connected to said sensing devices and operable in response to a signal indicating a collision threat for selectively interrupting said signal from at least one of said plurality of sensing devices, display means, and indication control means connected to said first means and to said display means for providing a definite indication period operation of said display means and for providing positive interruption of any other directional indication signal.

8. In a collision warning receive system of the type adapted to pass a signal derived from an object moving relative to the system, an evasive maneuver direction determining arrangement comprising: a plurality of sensing devices receptive of signals from distinct directions, a first means connected to said sensing devices and operable in response to a signal received by one of said sensing devices indicating a collision threat for selectively interrupting said signal from at least one of said plurality of sensing devices, display means connected to said first means and responsive to actuation thereof for providing a display indication for a definite period of time following initial activation of said display irrespective of subsequent loss of signal, and second means connected to said first means and to said display means for preventing and display means indication until an indication signal indicating said collision threat has been determined.

9. In a collision warning system of the type adapted to pass a signal derived from an object moving relative to the system, an evasive maneuver direction determining arrangement comprising: a plurality of sensing devices receptive of signals from distinct directions, a first means connected to said sensing devices and operable in response to a signal received by one of said sensing devices indicating a collision threat for selectively interrupting said signal from at least one of said plurality of sensing devices, display means connected to said first means and operable in response to actuation thereof for providing a display indication for a definite period of time following initial activation of said display irrespective of subsequent loss of signal, and second means connected to said first means and to said display means and including a time delay relay for preventing any display means indication until an indication signal indicating said collision threat has been determined.

10. A display control apparatus useful in a collision warning system having means for sensing a direction of an object, said apparatus comprising: warning indication means connected to said sensing means for providing an indication of a direction of an evasive maneuver necessary to avoid said object; and control means connected to said indication means for maintaining said warning indication for a period of time necessary for accomplishment of said evasive maneuver.

11. A display control apparatus useful in a collision warning system having means for sensing a direction of an object, said apparatus comprising: warning indication means connected to said sensing means for providing an indication of a direction of an evasive maneuver necessary to avoid said object; control means connected to said indication means for maintaining said warning indication for a period of time necessary for accomplishment of said evasive maneuver; and additional control means also connected to said indication means for permitting operation of said indication means only after said object has been determined to be and is remaining on a collision course with said system.

References Cited in the file of this patent

UNITED STATES PATENTS

| | | |
|---|---|---|
| 2,486,197 | Newbold | Oct. 25, 1949 |
| 3,040,314 | Hesse | June 19, 1962 |